April 25, 1950  G. S. MILES  2,505,135
CONSTANT SPEED MOTOR
Filed May 3, 1944
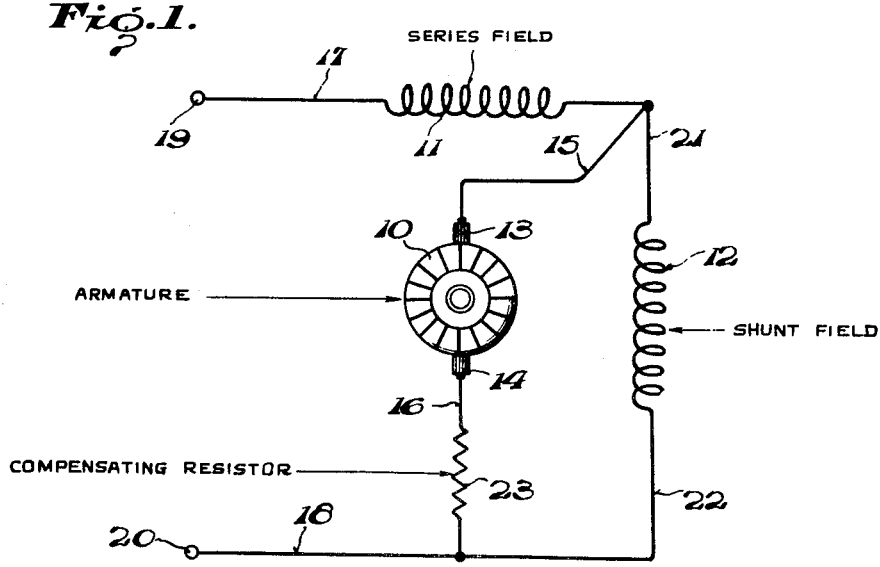
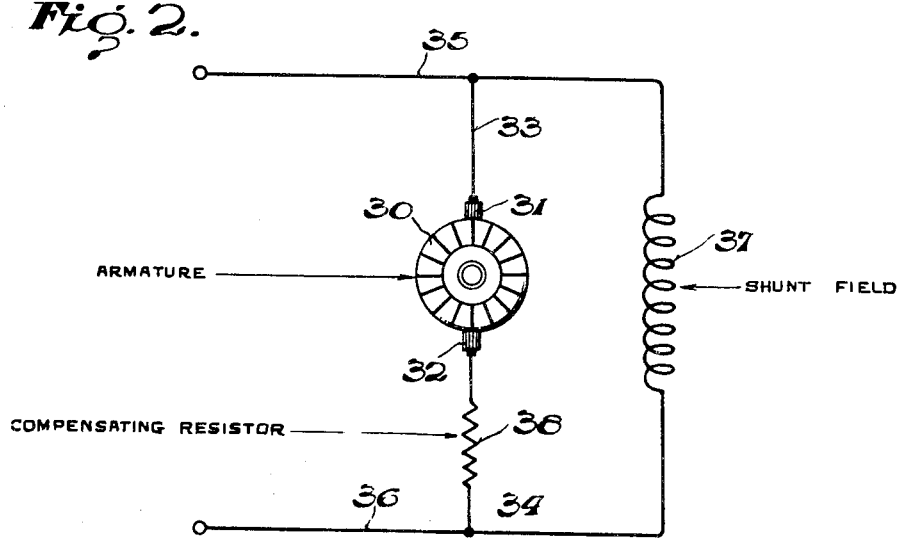
INVENTOR.
George S. Miles
BY
ATTORNEY Patented Apr. 25, 1950

2,505,135

UNITED STATES PATENT OFFICE 2,505,135

CONSTANT SPEED MOTOR

George S. Miles, West Englewood, N. J., assignor to Bendix Aviation Corporation, Teterboro, N. J., a corporation of Delaware Application May 3, 1944, Serial No. 533,897

4 Claims. (Cl. 318—334)

This invention relates generally to electric motors and more particularly to a motor embodying a shunt winding and the control of the speed of operation thereof.

It is well known to those skilled in the art that for a given constant load, the speed of a shunt or compound motor will vary with the temperature of the shunt winding, i. e., for a given load, the speed of such a motor will decrease as the temperature of the shunt winding decreases. Various expedients have been proposed to compensate for this error where the temperature changes affecting the shunt winding are those due to the operation of the motor.

Such known expedients, however, do not contemplate nor do they present a solution to the problem presented when the motor is used in a location where extremely low ambient temperatures prevail and affect the motor winding, one example of such use being where a motor of the above nature is incorporated into apparatus designed to operate in arctic regions and where the accuracy of the operation thereof depends to a large extent upon the requirement that the motor maintain a substantially constant speed of operation. Laboratory tests, for example, have disclosed that under room temperatures it will take a motor of the above type a given time to perform a certain operation while under low temperature conditions, all other conditions remaining as before, the motor will run nearly twice as long before it performs the same operation.

The reason for the decreased motor speed when low ambient temperatures prevail is that the resistance of the shunt winding is decreased in proportion to the low temperatures so that more current flows through the winding while the same counter electromotive force is generated in the armature whereby the speed of the motor is lowered. The present invention contemplates the provision, in a motor of the character described and in a novel manner, of a compensating resistor having a high temperature coefficient whereby in response to the ambient temperatures the resistance of the armature circuit will change thereby offsetting the increased current flow in the shunt winding and thereby providing a motor which under a constant load will have a substantially constant speed.

An object of the present invention, therefore, is to provide a novel and improved motor of the type embodying a shunt winding whereby with the use thereof the disadvantages previously encountered in locations having extremely low ambient temperatures will be overcome.

Another object of the invention is to provide a novel electric motor which, for a given constant load, will maintain a substantially constant speed of operation notwithstanding changes in ambient temperatures.

A further object is to provide a novel temperature responsive compensating means for a compound and/or shunt wound electric motor which for a given constant load will maintain a substantially constant speed of operation notwithstanding changes in ambient temperatures.

Another object is to provide a novel compound and/or shunt wound electric motor having a high temperature coefficient resistor arranged in series with the armature whereby in response to low ambient temperatures more current will flow to the armature through the resistor to offset the increased current flow through the shunt winding due to the same temperature.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, Figure 1 is a diagrammatic representation of a compound motor embodying the subject matter of the present invention; and, Figure 2 is a view similar to that of Figure 1 showing a shunt wound motor incorporating the novel compensating means of the present invention.

Referring now to the drawings for a more detailed description of the present invention, Figure 1 illustrates a compound motor comprising an armature 10, a series field winding 11 and a shunt field winding 12. The armature is provided with a conventional commutator engaged by brushes 13 and 14 which connect by means of leads 15 and 16 with conductors 17 and 18, the latter being connected to energizing taps 19 and 20 which communicate with a suitable source of power (not shown). Field winding 11 is connected with conductor 17 while shunt winding 12 is placed across conductors 17 and 18 and the armature by way of leads 21 and 22. The foregoing comprises a conventional compound motor and it is well known with the use of such motors that a variation in the temperature of the shunt winding produces a varying current flow therethrough resulting in a variation in the speed of the motor. Specifically, where ambient temperatures are low such as those encountered in artic regions, for example, the resistance of the shunt winding decreases so that an increased current flows through the winding thereby producing a consequent reduction in the speed of the motor.

Coming now to the novel subject matter of the present invention, it is shown in Figure 1 as comprising a resistor 23 connected with lead 16 to be in series with armature 10. Resistor 23 is constructed of iron wire or other suitable material having a high temperature coefficient and acts in response to low ambient temperatures to decrease the resistance drop of the armature thereby developing an effect opposite to that developed as a result of the increased current in shunt winding 12 whereby for a given load the motor speed will remain substantially constant notwithstanding ambient temperature changes. Moreover, by selecting the proper values of resistance and temperature coefficient, the motor can be designed to operate at a constant speed over a wide range of ambient temperatures.

The novel compensating resistor of the present invention has been shown in Figure 1 as applied to a compound motor but it may be applied equally as well to a shunt motor or any other motor having a shunt winding, current flow through which varies with changes in temperature. To this end reference is made to Figure 2 of the drawings wherein is shown a conventional shunt motor having an armature 30 engaged by brushes 31 and 32 which are connected in series by way of leads 33 and 34 with suitable power conductors 35 and 36, the latter being connected to a suitable source of direct current (not shown). A shunt field winding 37 is connected across the power conductors 35 and 36 and as is the case with the compound motor, above described, the resistance of the winding drops in response to low ambient temperatures so that more current will flow therethrough and, for a given load, the counter E. M. F. of the armature remains the same thereby reducing motor speed.

To overcome this disadvantage, a compensating resistor 38 having a high temperature coefficient and similar to resistor 23 of Figure 1 is connected in series with armature 30. With ambient temperature changes the effect due to the change in the resistance of the shunt winding resulting from temperature changes is offset by the variation in the value of the resistor connected in series with the armature.

It will now be obvious to those skilled in the art that a novel electric motor of the compound and/or shunt type has been provided by the present invention which, for a given load, will maintain a substantially constant speed of operation notwithstanding the presence of low ambient temperatures and one that will operate reliably over a wide range of ambient temperatures.

Although two embodiments of the present invention have been illustrated and described in detail, it is to be expressly understood that the invention is not limited thereto. Various changes may be made in the design and arrangement of parts without departing from the spirit and scope of the invention, as will now be understood by those skilled in the art. For a definition of the limits of the invention, reference will be had primarily to the appended claims.

I claim:

1. In combination, a motor having a driven armature adapted for connection across a power source, a shunt winding connected across said armature and adapted for energization from said source for driving said armature, said winding responding to temperature changes for varying current flow therethrough whereby for a given load the speed of said motor varies, and a temperature responsive member in series with said armature and having a positive temperature coefficient for compensating for the variation in current flow in said winding whereby the speed of said motor remains substantially constant.

2. In combination, a compound motor having a driven armature adapted for connection across a power source, a field winding in series with said armature, a shunt winding connected across said armature and adapted for energization from said source for driving said armature, said shunt winding responding to ambient temperature changes for varying current flow therethrough whereby for a given load the speed of said motor varies, and a member having a high positive temperature coefficient arranged in series with said armature and responding to said ambient temperature changes for compensating for the variation in current flow in said shunt winding whereby the speed of said motor is maintained substantially constant.

3. In combination, a motor having a driven armature adapted for connection across a power source, a shunt winding connected across said armature and adapted for energization from said source for driving said armature, said winding responding to temperature changes for varying current flow therethrough whereby for a given load the speed of said motor varies, and an iron wire resistor in series with said armature responsive to said temperature changes and having a positive temperature coefficient for compensating for the variation in current in said winding whereby the speed of said motor will be maintained substantially constant.

4. In a speed regulating system for an electric motor having an armature, in combination, a shunt field winding for said armature whose resistance to current flow varies in response to changes in temperature, and a member having a high positive temperature coefficient arranged in circuit with said armature and responsive to said temperature changes for compensating for the resistance change of said winding.

GEORGE S. MILES.

REFERENCES CITED

The following references are of record in the file of this patent:

UNITED STATES PATENTS

| Number | Name | Date |
|---|---|---|
| 339,773 | Hering | Apr. 13, 1886 |
| 778,222 | Churchward | Dec. 27, 1904 |
| 1,323,761 | Hall | Dec. 2, 1919 |
| 2,134,900 | Von Ohlsen | Nov. 1, 1938 |
| 2,238,617 | Baker | Apr. 15, 1941 |

FOREIGN PATENTS

| Number | Country | Date |
|---|---|---|
| 303,385 | Germany | May 22, 1920 |
| 436,170 | Great Britain | Oct. 7, 1935 |

OTHER REFERENCES

"Prin. Elec. Motors," Fox, McGraw-Hill, 1st edition, 1924, pp. 21 and 301.